(12) United States Patent
Ainsworth

(10) Patent No.: US 7,774,918 B2
(45) Date of Patent: Aug. 17, 2010

(54) DRILLING APPARATUS AND METHOD

(75) Inventor: Stephen Joseph Ainsworth, Warwickshire (GB)

(73) Assignee: ThyssenKrupp Drauz Nothelfer GmbH, Heilbronn (DE)

( * ) Notice: Subject to any disclaimer, the term of this patent is extended or adjusted under 35 U.S.C. 154(b) by 698 days.

(21) Appl. No.: 11/546,730

(22) Filed: Oct. 11, 2006

(65) Prior Publication Data
US 2007/0175015 A1  Aug. 2, 2007

(30) Foreign Application Priority Data
Jan. 30, 2006  (GB) ................. 0601811.3

(51) Int. Cl.
*B21D 39/00* (2006.01)
(52) U.S. Cl. .................................... 29/524.1
(58) Field of Classification Search ............... 29/524.1, 29/525.01, 525.06, 505, 464, 428, 407.09, 29/423, 559, 721
See application file for complete search history.

(56) References Cited
U.S. PATENT DOCUMENTS
5,971,678 A  10/1999  Linderholm

FOREIGN PATENT DOCUMENTS

| DE | 3909076 | 10/1989 |
|----|---------|---------|
| DE | 4320282 | 12/1994 |
| DE | 201 02 539 U 1 | 11/2001 |
| DE | 101 50 264 A 1 | 5/2003 |
| EP | 1 382 406 A2 | 1/2004 |
| EP | A2 1382406 | 1/2004 |
| GB | 2 148 170 A | 5/1985 |
| GB | A 2148170 | 5/1985 |
| WO | WO 2005/077568 | 8/2005 |
| WO | WO 2005/077568 A1 | 8/2005 |

*Primary Examiner*—John C Hong
(74) *Attorney, Agent, or Firm*—Klarquist Sparkman, LLP (57) ABSTRACT

A method and apparatus are disclosed for securing a first target element to a second target element. The method includes the steps of locating a support member arranged to simultaneously support a drilling head device and a riveting head device at a predetermined location proximate to the first and second target elements, via the drilling head drilling at least one hole through the first and second target elements at a desired location and without relocating the support member via the riveting head device, inserting a rivet in said hole and securing the inserted rivet.

18 Claims, 7 Drawing Sheets

DRILLING APPARATUS AND METHOD

This application claims the benefit of Great Britain Application No. 0601811.3, filed on Jan. 30, 2006, which is incorporated herein in its entirety.

The present invention relates to a method and apparatus for securing component parts of a construction together. In particular, but not exclusively, the present invention relates to the assembly of component parts using rivets and optionally, adhesive. The method and apparatus may advantageously be used for securing together metal component parts of the type used in the aerospace industry when constructing an aircraft.

It is well known that when constructing a desired object various component parts must from time to time be secured together. Many techniques are known for carrying out the securing process and the choice of which securing mechanism and methodology should be used is often dependent upon the nature of the structural elements which are to be connected together.

One known securing technique uses a wet adhesive which may be applied to one or more opposing surfaces of the elements which are to be secured together. The elements are then urged together and as the adhesive dries a bond is formed securing the two elements together. It is, however, known that adhesive bonds can break should the construction elements be subject to adverse elemental conditions or urging forces which may tend to separate the elements.

Another known technique which is applicable when securing elements together is a riveting process. During such a process two construction elements which are to be secured together must be held in a fixed position with respect to each other and holes drilled through the two elements at desired locations. With the two elements held in position so that the holes drilled therethrough are kept in an aligned format, rivets may be duly located through the prepared holes and locked in place.

Figure 1:
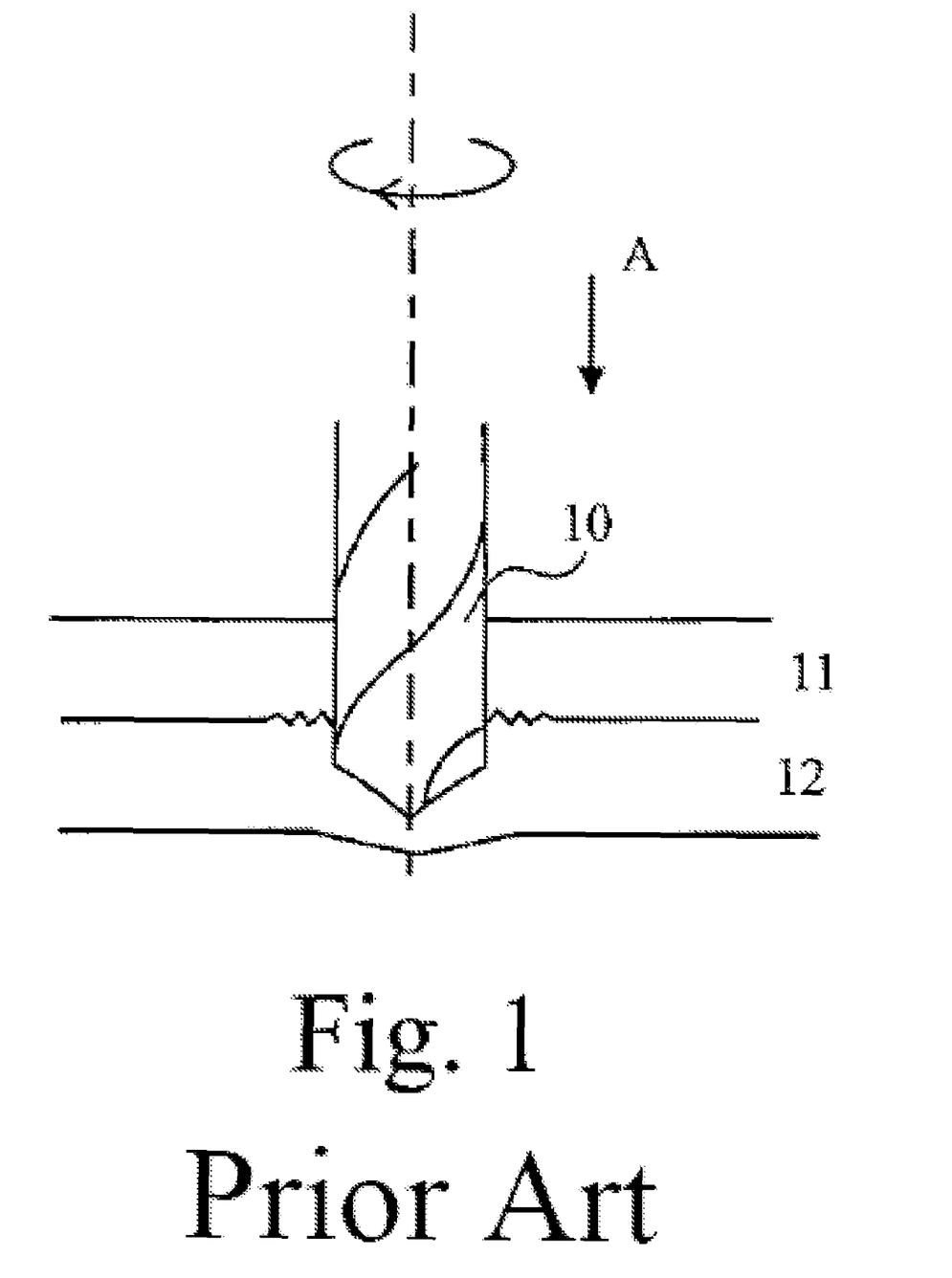
FIG. 1 illustrates a conventional drilling process.

An example of when such a process might be used is when parts of an aircraft are being assembled. FIG. 1 illustrates a known technique for securing component elements together within the aerospace industry. This process can include the connection of sheet material which will form the skin of an aircraft to one or more strengthening supports such as ribs or stringers. During a first stage holes must be drilled via a drill tip 10 through a first construction element 11 and a juxtaposed second target element 12. During a second stage the elements are riveted together.

A number of known problems occur during this type of conventional drilling stage.

Firstly, as a drill bit 10 is urged into the component elements in the direction of arrow A, shown in FIG. 1, a force is exerted at the drill bit tip region 13 which can cause deformation of an exit hole formed on the exit side of the component elements. A burr is thus generated at the exit point in a hole. The burr which is formed of undesired debris can contaminate a fastening and/or can provide an electrical contact between adjacent metal elements. To overcome this, it is current practice to dry assemble the parts together, drill a pilot hole, disassemble the assembly, deburr the holes, reassemble the assembly, drill out the holes to a larger size, disassemble the assembly, deburr the holes, reassemble the assembly, ream the holes to finish size, disassemble the assembly, deburr the hole and then apply any desired electrical insulation adhesive to joint faces between the two component elements. Subsequently a final assemble stage occurs and rivets are then applied to the drilled holes. As will be appreciated, this is a many-stage process which is time consuming and thus costly.

It will be noted that swarf, which is also a form of debris material removed during the drilling process, is not positively removed from the hole in known prior art techniques. This swarf can thus fall in either direction to an exit or entry side and this can contaminate a construction.

As will be appreciated, the assembly of a large construction such as an aircraft can involve the preparation of thousands and maybe tens of thousands of holes each of which must be filled with their respective rivets. Thus a multi-step process for drilling holes is highly inconvenient.

A still further problem with known techniques occurs when at least one of the component elements which is to be secured to another is a relatively thin component. Such is the case when a thin sheet of material which is to form an outer skin is to be secured to support ribs. Reference will be made hereinafter to thin material and it is to be understood that this relates to sheet material preferably having a thickness in the region of the range of 0 to 5 mm and particularly having a maximum thickness of 8 mm.

When drilling through thin materials a twist drill of the type shown in FIG. 1 can form a hole which is not round in shape. Such a shape is desired if a rivet having a pre-prepared dimension is to be closely fitted in a hole. Of course the drilled hole will be generally round but will not be so round as to ensure that a subsequent rivet will fit closely to the drilled hole around its entire circumference. Even with a reaming operation, it is not possible to generate the round hole required for consistent rivet quality and reject rates as high as 20% are not uncommon. A significant amount of rework is therefore needed to attend to below standard holes.

It will be appreciated that under certain circumstances flush rivets may be required on at least one side of an assembly formed by the two secured construction elements. This is particularly likely when one surface will form an outer surface of an aircraft or other vehicle where aerodynamic considerations are paramount. Where such flush rivets are required, extra countersink and deburr operations are required before the final assembly. Again, this increases the complexity and thus time and cost taken for construction.

Another problem with known techniques is that the methodologies used for securing construction elements together are labour intensive. That is to say, they do not lend themselves well to automation since human operators are often required to manually carry out drilling and/or riveting and/or assembling and/or disassembling processes.

It is an aim of the present invention to at least partly mitigate the above-mentioned problems.

It is an aim of embodiments of the present invention to provide a drilling and riveting process by which construction elements can be secured together in a timely and efficient manner.

It is an aim of embodiments of the present invention to provide a method and apparatus for securing construction elements together using an automated process.

According to a first aspect of the present invention there is provided a method for securing a first target element to a second target element, comprising the steps of:
  locating a support member arranged to simultaneously support a drilling head device and a riveting head device at a predetermined location proximate to the first and second target elements; and
  via said drilling head device, drilling at least one hole through the first and second target elements at a desired location; and
  without re-locating said support member, via said riveting head device, inserting a rivet in said hole and securing the inserted rivet.

According to a second aspect of the present invention there is provided apparatus for securing a first target element to a second target element, comprising:
 a drilling head;
 a riveting head; and
 a support member arranged to simultaneously support the drilling head and riveting head during a drilling and riveting mode of operation.

Embodiments of the present invention provide a method and apparatus which allows an end effector on the wrist of a robot or the head of a Computer Numerical Control (CNC) machining centre to carry a support which carries a drilling and riveting head. The support can be located in a single position and many holes drilled and riveted in that one position.

Embodiments of the present invention enable drilling of one or more holes through juxtaposed construction elements to be made in a one-step process.

Embodiments of the present invention provide the advantage that electrical insulation adhesive may be applied wet to joint faces of opposing construction elements and then holes are drilled and riveted to secure the assembly whilst the insulation adhesive remains wet.

Embodiments of the present invention provide a method and apparatus which can be wholly or generally automated. This greatly reduces the man hours required to produce a riveted assembly.

Embodiments of the present invention provide a method and apparatus for drilling and riveting together parts of an aircraft.

Embodiments of the present invention will now be described hereinafter, by way of example only, with reference to the accompanying drawings in which.

In the drawings like reference numerals refer to like parts.

Reference will now be made hereinafter to a process for securing a thin metal sheet to a metal strut. Such construction elements are common in the aeronautical industry where a sheet of material is to form a skin of an aircraft and is to be fixed to an aircraft superstructure comprising many ribs and stringers. It is to be appreciated that the present invention is not restricted to such use but rather is generally applicable where a first target element is to be secured to a second target element. It is also to be understood that the present invention is not restricted to the securing together of two metal elements. Nor is the present invention restricted to securing only two elements together. Three, four, or possibly more sheets and/or support elements may be secured together.

Figure 2A:
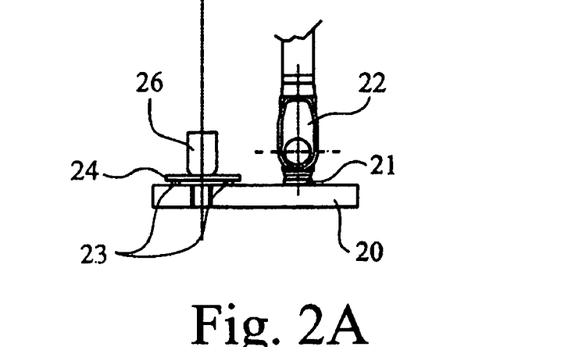
FIG. 2 illustrates a support structure for a drill and rivet head.

As shown in FIG. 2A, a base plate 20 is releasably secured to an end effector 21 of a robot wrist 22. It will be appreciated that embodiments of the present invention are not restricted to use with a robot arm but rather are generally applicable and may be either manually located or located automatically by any locating mechanism. A further alternative for the wrist of the robot would be the head of a CNC machining centre. The base plate once duly located at a particular location with respect to one or more target elements is held rigidly in position until it is to be moved and located elsewhere.

The base plate 20 supports a pair of guide rails 23A, 23B, which are rigidly secured to the base plate in a fixed parallel orientation. It will be understood that embodiments of the present invention are not restricted to a pair of guide rails but may rather have more than two guide rails or may have only one guide rail. Also rather than extending outwardly from the base plate as a guide rail guide grooves or slots may be utilised.

A sub-plate 24 is secured to the guide rails in a slidable-configuration so that the sub-plate 24 may slide along the guide rails in a direction in and out of the page shown in FIG. 2A. The sub-plate 24 carries a drilling head 25 and riveting head 26 in a fixed position on the sub-plate.

Figure 2B:
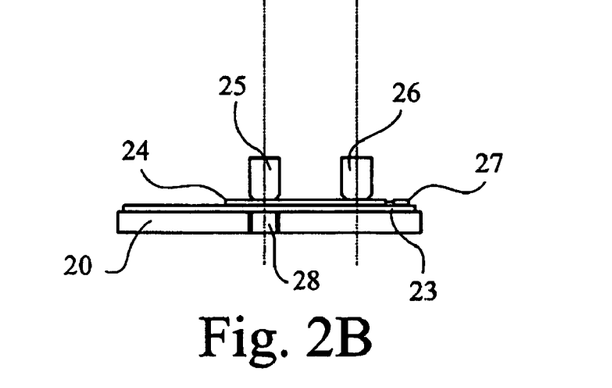

As shown more clearly in FIG. 2B, a stepping motor 27 provides a drive element for driving the sub-plate along the guide rails by selectable distances. It will be understood that other drive elements may be provided by further embodiments of the present invention such as pneumatic means. The stepping motor 27 may be driven so as to locate the sub-plate 24 at any desired location along the guide rails 23. In particular, the sub-plate 24 is driven so as to locate a drilling head 25 above an opening 28 (such as a hole or cut-away section) formed in the base plate 20. The opening 28 is sufficiently large so that more than one hole can be drilled therethrough when the base plate 20 is located by the robot 20 at a predetermined location with respect to target elements. The stepping motor 27 can then be driven step-by-step to duly locate the drilling head 25 at a plurality of corresponding locations exposed by the opening 28 and where holes are to be drilled.

Figure 2C:
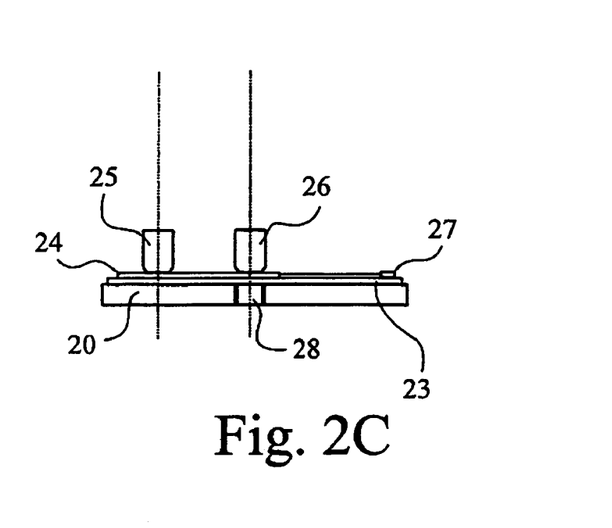

When all desired holes have been drilled through target elements exposed by the opening 28 with the base plate 20 at a particular location, the stepping motor 27 is driven to move the sub-plate to thereby align the riveting head 26 generally over the hole 28. This is illustrated further in FIG. 2C. In this position the stepping motor can be driven to enable the riveting head to apply rivets through holes predrilled by the drilling head 25 through the target construction element exposed by opening 28.

Figure 3:
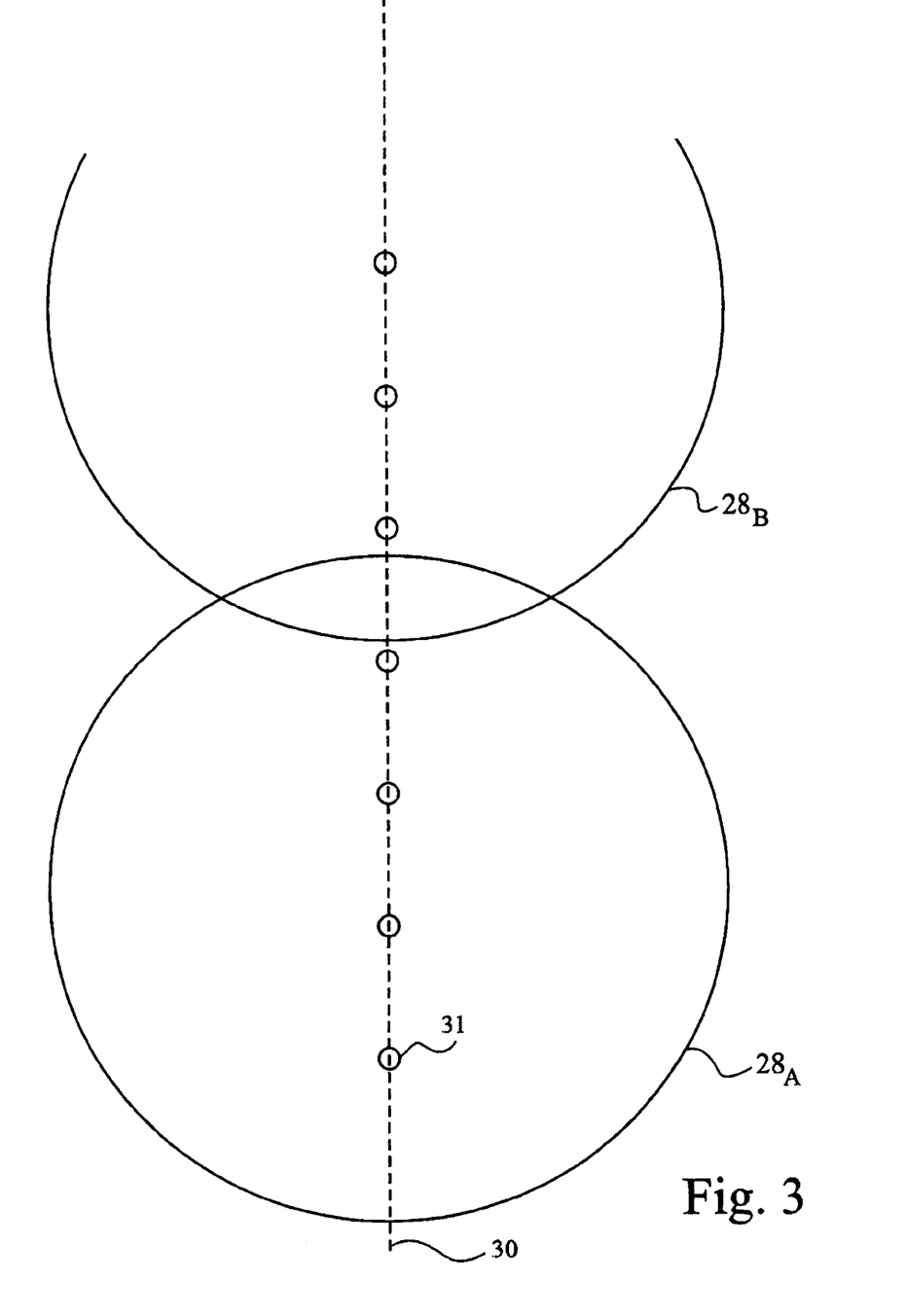
FIG. 3 illustrates the movement of a support structure when a row of holes is to be drilled and riveted.

FIG. 3 illustrates how a row 30 of holes 31 may be formed through juxtaposed target elements. To form a first sub-row of holes the robot or other locating device is used to locate the opening 28 of base plate 20 at a first location with respect to the target elements which are to be secured together. The base plate is then held in a rigid fixed location whilst a drilling and riveting process proceeds. The opening 28 illustrated in this first position is indicated by reference $28_A$ in FIG. 3. This area exposes a plurality of four hole locations where holes are to be drilled. The stepping motor 27 drives the drilling head along rails 24 until a drilling element is located at a site corresponding to a location where a hole is to be drilled. A hole is then drilled. Next the drilling element is moved to a next location where a further hole is to be drilled. The further hole is then drilled.

A riveting process follows the generation of holes in each sub row prior to movement of the base plate 20 from a first location with the opening 28 in position $28_A$ to a new position. In this way holes can be drilled and riveted by a drilling head and riveting head which are held in fixed orientation with respect to one another but which can be duly located with respect to target construction elements independently of the movement of a base plate which is located by automatic means such as a robot.

When all holes in the sub row exposed in position $28_A$ are drilled, the robot 22 moves the base plate 20 so that the opening 28 is located at a second location identified by reference $28_B$. This area exposes a portion of the target elements where a further sub row is to be drilled. This sub row can then be drilled with the base plate 20 held at this further location.

Figure 4:
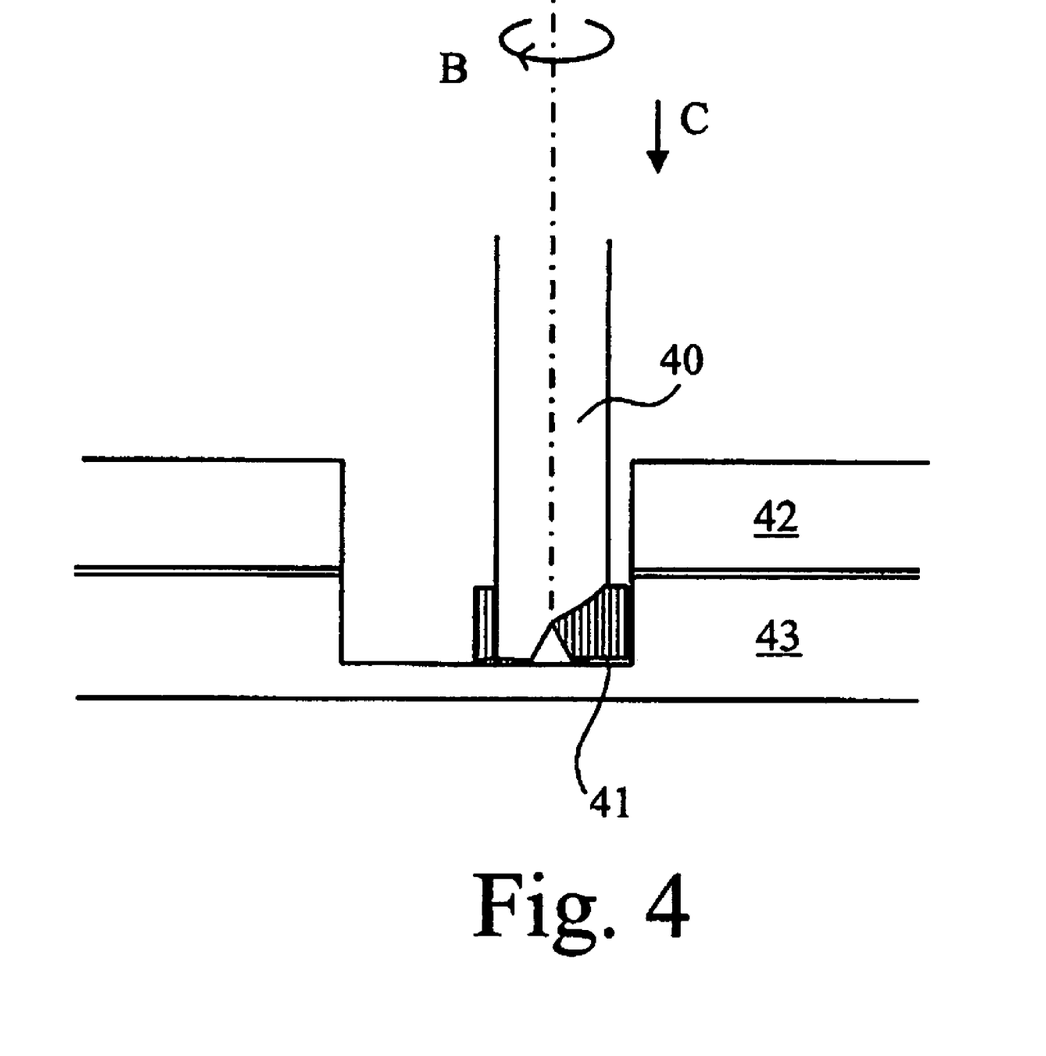
FIG. 4 illustrates a drilling process.

FIG. 4 illustrates a drilling element 40 of the drilling head 25. The drilling head 25 is of a type which can generate round holes when drilling through target elements and which can drill through thin material at high tolerance. One such drilling process is an orbital drilling process. Embodiments of the present invention are not restricted to use of orbital drill heads.

The orbital drill element 40 includes a cutting tooth 41 so that as the drilling element 40 is rotated as shown by arrow B in FIG. 4, the tooth 41 removes material from the metal sheet 42 and metal rib 43. The orbital drill tip 40 is urged in the direction of arrow C until a hole is generated all the way through the target assembly.

In order to drill out a hole through the target construction elements the drill tip 40 is additionally rotated about a central axis of the hole thereby clearing a hole through the material which has an internal diameter greater than a diameter of the cutting tooth 41. As a result of this particular drilling technique a round burr free hole may be drilled through a wet assembly. That is to say a round hole may be formed all the way through all juxtaposed panels and adhesive layers. The drilling process does not cause metallic swarf to be forced into the electrical insulator adhesive which may be located between the parts being assembled. This helps ensure that the electrical insulation between the parts is not compromised. It will be understood that the motion of the drill tip 40 with respect to the construction elements 42, 43 is controlled automatically by the drilling head 25 which is secured to the sub-base 24 in a fixed and rigid configuration. The sub-base 24 may be moved to a desired location and then the drilling head 25 controls the location of and rotation of the drill tip 40 and respective tooth 41. In this way it will be understood that the orbital drilling head (and indeed the rivet head described further hereinafter) operate independently of the robot or other positioning device which locates the base plate 20 at a predetermined location with respect to the construction parts. In this way the robot/carrying device is used solely as a positioning device.

Using an orbital drilling process helps produce a round hole of accurate and repeatable diameter in any thickness or type of material. The process generates very little end thrust which ensures that there are substantially no forces tending to push away the robot or positioning device. Additionally, the lack of or very small amount of end thrust means that there is no requirement for any support for the cutting tool (i.e. drill bushes) to prevent wander. Advantageously the drilling process can also handle a range of hole diameters and types with one tool. It will be noted that any swarf generated during the drilling process can be removed by a suction process (not shown) which prevents contamination. Also the drilling process does not generate any burr at the breakthrough points in the hole.

Subsequent to a hole being drilled at a desired location, a rivet is placed in the hole. The rivet may be placed in the hole immediately after the hole is drilled by driving the sub-plate 24 along the guide rails to align the riveting head 26 over the hole or the riveting process may be carried out after a number of holes have been drilled. Rivets are placed in each hole which is drilled with the base plate 20 located at any single position.

Figure 5A:
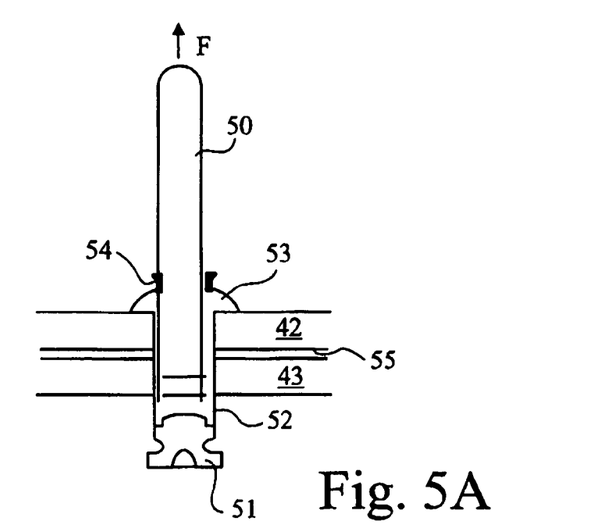
FIG. 5 illustrates a riveting process.
Figure 5B:
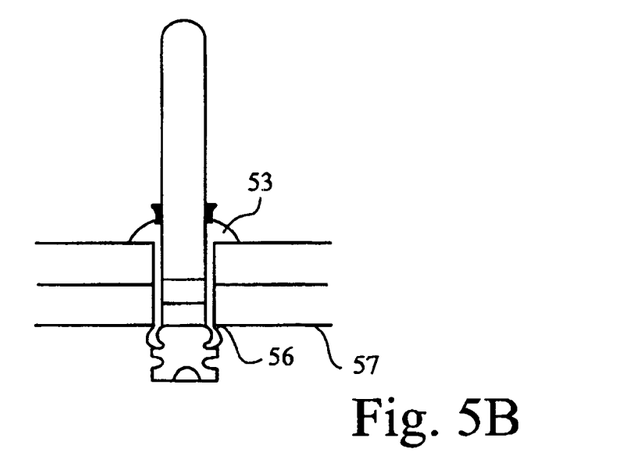

As shown in FIG. 5, a rivet includes a stem 50 which may be used to urge a shear ring 51 in a direction upwardly shown by arrow F in FIG. 5. As the stem (or shank) is urged upwardly the shear ring is forced into a lower mouth of the rivet body 52. This is located on a first inner (or exit) side of a construction assembly. A second side which may typically be on the outside of a vehicle which is being constructed carries a rivet head 53 which extends from the rivet body 52 at the open mouth of the hole drilled during the previous drilling process. The rivet also includes a locking collar 54.

Before pulling on a rivet begins a small gap may be present between the juxtaposed construction elements 42, 43. This gap 55 may be filled with some wet adhesive. As the riveting process proceeds the rivet shank 50 is urged upwardly by the riveting head 26. The stem is thus pulled into the rivet sleeve and starts to form a bulb blind head. This action is illustrated more clearly in FIG. 5B where it will be understood that the action of urging the shaft 50 away from the juxtaposed target materials causes the shear ring which is connected to the shank to urge against an end of the sleeve-like rivet body 52. The ends of the rivet body thus begin to deform outwardly and an outer engaging surface 56 begins to urge against a surface 57 of the component part 43. This motion tends to close the space 55 in a clamping operation. As the stem continues to bulb out the blind-side head, the rivet head 53 remains firmly seated on the non-blind side of the construction. Once the formation of the blind-side head and hole filling are completed the shear ring shears from the stem cone to allow the stem to pull further into the rivet. This allows the centre hole in the rivet which carries the shank to be sealed helping to ensure it is water tight.

Figure 5C:
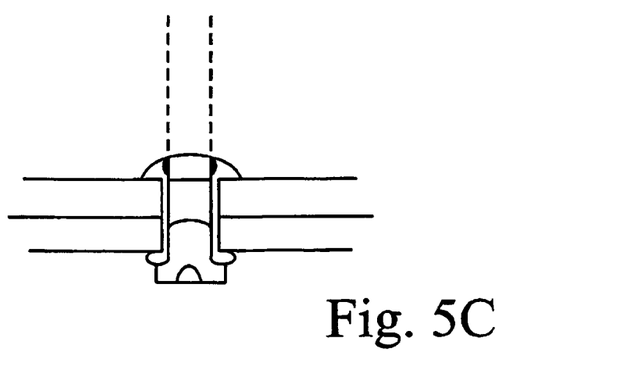

FIG. 5C illustrates a completely installed rivet in a maximum grip state in which the pulling head of the riveting head 26 has inserted a locking collar and the stem has fractured flush with the rivet head. It will be understood that during the pulling mode of operation the shank yield may be monitored throughout. A sweet spot window may be defined within which favourable yield point characteristics will exist. If a stem fractures during this sweet spot window the rivet may be determined to satisfy predetermined tolerance characteristics. If the monitoring step indicates that the stem has fractured outside this sweet spot window (indicating that the shank may have yielded too early or too late in the riveting process) the rivet may be marked by the riveting head 26, such as by spraying highly visible paint on the rivet, to indicate that that rivet should be examined and possibly replaced. It will be understood that when utilising a marker to point out rivets which may potentially fail ink levels in the system are monitored and/or test spots sprayed prior to each riveting step so that potentially faulty rivets are not overlooked. By monitoring the characteristics of the riveting process during each riveting step, that data may be stored so that a hole data flow may be collated during the assembly of a large construction. Such data may be provided to an end user to help provide traceability.

Figure 6:
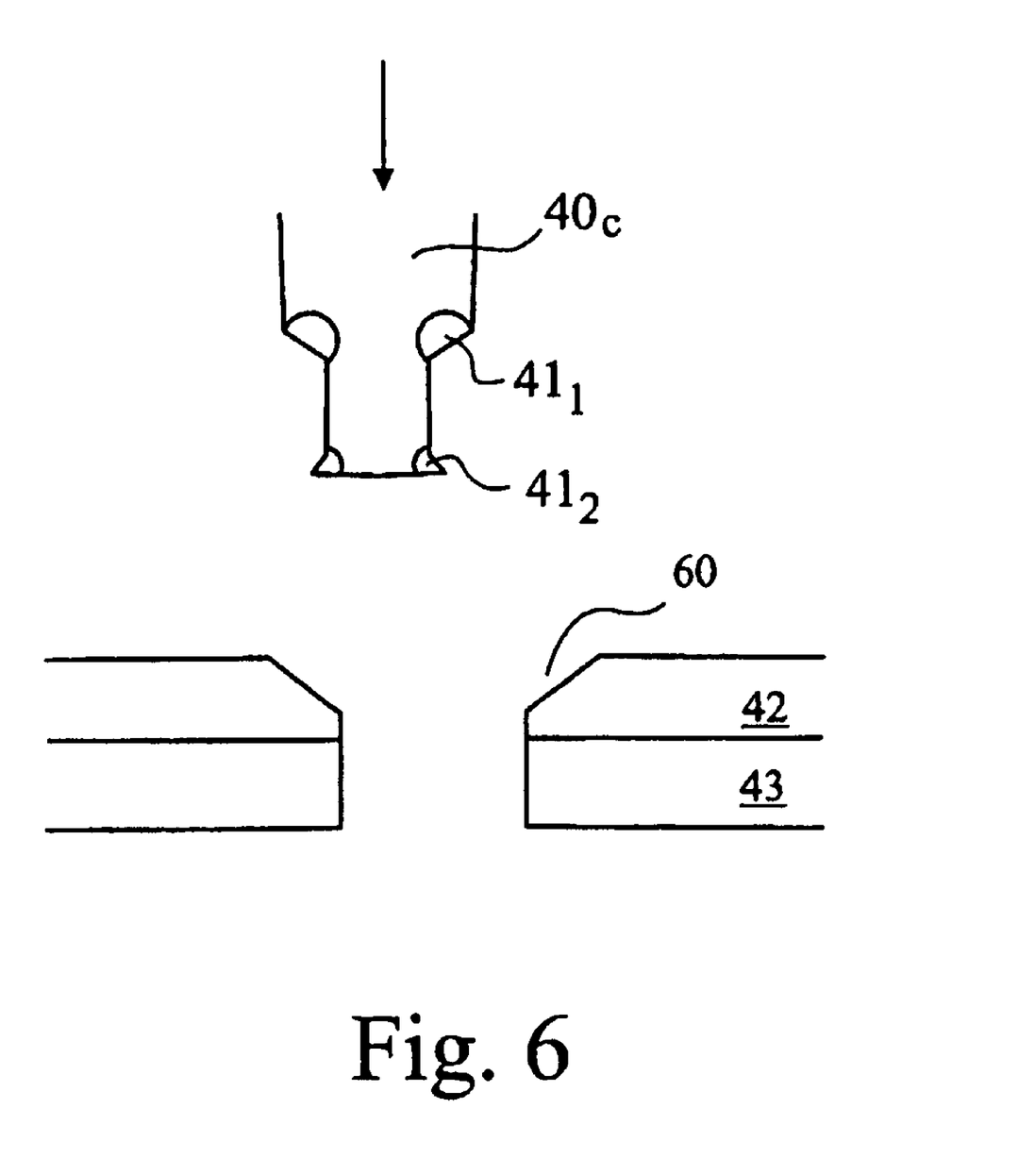
FIG. 6 illustrates drilling a countersunk hole.

FIG. 6 illustrates how embodiments of the present invention can drill holes through component parts of an assembly with the holes being countersunk. This requires use of a drill tip 40$_c$ with cutting teeth 41$_1$, 41$_2$. It will be appreciated that by forming a countersunk region 60 rivets subsequently located in the hole may be arranged in a flush arrangement so as to improve aerodynamic characteristics of a vehicle so manufactured.

Figure 7:
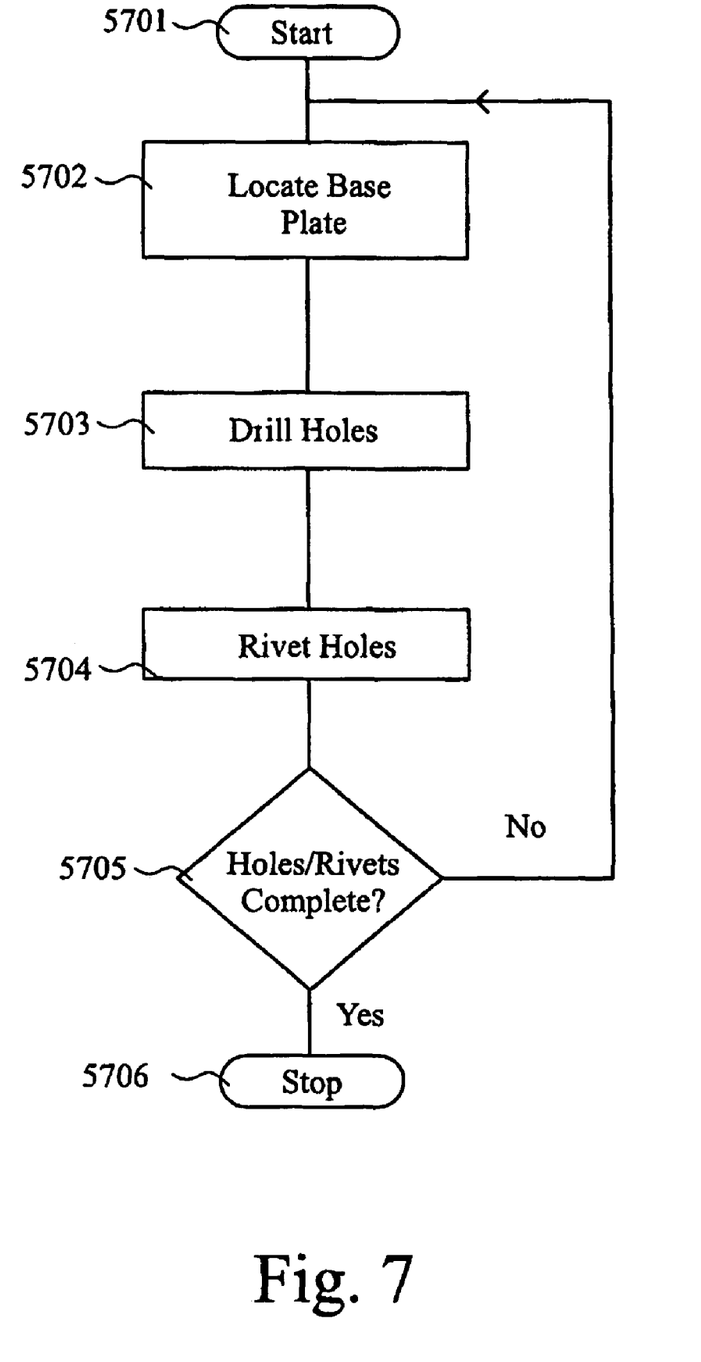
FIG. 7 illustrates process steps when drilling and riveting.

FIG. 7 illustrates a process according to an embodiment of the present invention which can be used to secure two or more component parts together. Advantageously the component parts may comprise metal parts of an aircraft. The process begins at step S701 in which a robot wrist 22 locates a base plate 20 arranged to simultaneously carry a drilling head 25 and riveting head 26. These may be placed at a predetermined location proximate to the target elements. The base plate is located near enough so that drilling and riveting equipment carried by the base plate can penetrate through a central opening 28 in the base plate and reach the construction elements. The location of the base plate occurs automatically according to predetermined locating commands provided to the robot. Subsequent to the base plate 20 being duly located, the robot remains motionless locking the base plate in a fixed position with respect to the construction parts.

With the base plate fixed in position an area on an outer surface of the component parts is revealed by the opening 28 formed in the base plate. This area defines a working area within which holes can be drilled through the component parts and rivets fixed. A shuttle sub-plate mounted on the base plate is arranged to run along high accuracy bearing rails 23 which help minimise wander or movement which may otherwise affect the accuracy of the shuttle. The shuttle is operated by a drive means such as an electric stepper motor along a ball screw and is arranged to run between fixed dead stops (or alternatively by limitations in the stroke of a pneumatic cylinder or the length of the ball screw).

The sub-plate carries both the orbital drilling head and a riveting head and the shuttle is set so that the centre line of the drilled hole and the centre line of the rivet exactly coincide after shuttling. The drilling head 25 is positioned where a first hole is to be drilled and then a round hole is drilled through both component parts at that desired location. The drilling of a hole is a one-step process without the need to predrill a pilot hole or smaller diameter hole. During the drilling process an extractor device such as a suction cleaner removes the drilled material. After a first hole is drilled a check is made as to whether all necessary holes have been drilled through the construction parts in the area defined by opening 28 in the base plate with the base plate fixed at that single location. If not then subsequent holes are drilled through that area at desired locations by moving the sub plate to thereby make a corresponding movement of the drilling head 25 but keeping the base plate in a fixed location. (It will be understood that rather than drilling multiple holes it would be possible to drill one hole and then immediately rivet that hole according to further aspects of the present invention).

When all holes have been drilled through the component parts with the base plate fixed in position, each hole is riveted in turn one-by-one.

During the riveting process the sub-plate 24 is duly located by virtue of the drive means so that the riveting head 26 is located above the orifice 28 in the base plate 20. A rivet is then located through a predrilled hole and is urged against that hole by the riveting head 26. A stem of the rivet is then pulled causing the blind-side of the sleeve body of the rivet to bulge outwardly to form a bulb head thus locking the rivet in place. Yield of the rivet stem is monitored constantly and a point in time noted when the rivet shank begins to yield and subsequently shears. Providing the shearing occurs at a predetermined point, as indicated by certain parameters being satisfied, the riveting process is determined to have been successful. Each hole which is drilled is riveted one-by-one until a rivet has been duly located in each hole.

At step S705 a determination is made as to whether all holes and rivets have been completed in an assembly. If not, the robot wrist 22 is relocated with respect to the target construction elements thereby revealing a new area at which new holes and rivets may be located. This process is repeated until all holes/rivets have been completed, after which the process stops, as shown by step S706.

Embodiments of the present invention provide the advantage that each hole can be drilled and riveted in one setting. That is to say a robot locates a drilling head and riveting head at one position and then fixes itself in place. A drilling head and riveting head may be driven independently and automatically with respect to this set position.

Embodiments of the present invention provide the advantage that electrical insulation adhesive may be applied to joint faces in juxtaposed component parts with these parts then being assembled. Drilling and riveting of holes in turn to secure the assembly can thereafter take place whilst the adhesive remains wet.

Embodiments of the present invention provide the advantage that because the base plate is fixed in location whilst riveting and drilling takes place, accurate alignment of the riveting head to locate the head where predrilled holes have been formed becomes possible.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

I claim:

1. A single sided method for securing a first target element to a second target element, comprising the steps of:
    locating a support member arranged to simultaneously support a drilling head device and a riveting head device at a predetermined location proximate to the first and second target elements;
    locating a further support member arranged to carry said drilling head device and said riveting head device with respect to said support member by driving said further support member along at least one guide rail, groove or slot of said support member;
    via said drilling head device, drilling at least one hole through the first and second target elements at a desired location; and
    without re-locating said support member, re-locating said further support member and via said riveting head device, inserting a single-sided access rivet in said hole and securing the inserted single-sided access rivet,
    wherein said drilling head device comprises an orbital drill head and said step of drilling at least one hole comprises drilling at least one hole through the first and second target elements via the orbital drill head.

2. The method as claimed in claim 1, further comprising the steps of:
    for each hole of said at least one hole, said step of drilling a hole comprises drilling a round hole through the first and second target elements.

3. The method as claimed in claim 1, further comprising the steps of:
    for each hole of said at least one hole, said step of drilling a hole comprises drilling a hole having dimensions selected to allow the hole to receive the rivet which is to be inserted in the hole in a single-pass process.

4. The method as claimed in claim 1 wherein said step of drilling at least one hole comprises drilling a blind hole.

5. The method as claimed in claim 1 wherein said step of drilling at least one hole comprises drilling a countersunk hole.

6. The method as claimed in claim 1, further comprising the steps of:
the step of drilling at least one hole comprises drilling one hole and subsequently inserting and securing a single-sided access rivet in said one hole prior to drilling a further hole through the first and second target elements.

7. The method as claimed in claim 1, further comprising the steps of:
said step of drilling at least one hole comprises drilling a plurality of holes through said first and second target objects in a row and subsequently inserting and securing a single-sided access rivet in each hole of said row one-by-one.

8. The method as claimed in claim 1, further comprising the steps of:
said step of inserting a single-sided access rivet comprises locating a body portion of the rivet through each drilled hole, said body portion having a cross section matching a diameter of a drilled hole.

9. The method as claimed in claim 8 wherein said step of securing an inserted single-sided access rivet comprises urging a rivet shank away from the first target element thereby forming a "stopper" portion of the rivet on a side of the second target element.

10. The method as claimed in claim 9, further comprising the steps of:
monitoring yield in a rivet shank as the shank is urged away from the target elements and storing data indicating the monitored yield over time.

11. The method as claimed in claim 10, further comprising the steps of:
marking a single-sided access rivet so as to indicate a potentially faulty securement responsive to data stored during said monitoring step.

12. The method as claimed in claim 8 wherein said single-sided access rivet is an aluminium single-sided access rivet or a stainless steel single-sided access rivet or a duralumin single-sided access rivet.

13. The method as claimed in claim 1 wherein said first target element is a sheet material having a cross section of less than 8 mm.

14. The method as claimed in claim 1 wherein said first target element is a sheet material having a cross section of less than 5 mm.

15. The method as claimed in claim 1, further comprising the steps of:
applying a wet adhesive between said first and second target elements prior to said step of drilling at least one hole and subsequently drilling the hole whilst the adhesive remains wet.

16. The method as claimed in claim 1, further comprising the steps of:
subsequent to drilling the at least one hole and inserting and securing a single-sided access rivet in each hole, relocating the support member to a further predetermined location proximate to said first and second target elements.

17. The method as claimed in claim 16, further comprising the steps of:
via said drilling head, drilling at least one further hole through the first and second target element and inserting and securing single-sided access rivets at each further hole with said support member fixed at said further predetermined location.

18. The method as claimed in claim 1, wherein said first target element comprises an outer skin sheet of material for an aircraft and said second target element comprises a rib member or stringer member of an aircraft.

* * * * *